(12) United States Patent
Eschbach et al.

(10) Patent No.: US 7,102,792 B2
(45) Date of Patent: Sep. 5, 2006

(54) SYSTEMS AND METHODS FOR MODIFYING IMAGE DATA FOR BACKGROUND PRINTING

(75) Inventors: Reiner Eschbach, Webster, NY (US); Charles M. Hains, Altadena, CA (US); Keith D. Collins, Claremont, CA (US)

(73) Assignee: Xerox Corporation, Stamford, CT (US)

( * ) Notice: Subject to any disclaimer, the term of this patent is extended or adjusted under 35 U.S.C. 154(b) by 1110 days.

(21) Appl. No.: 10/046,148

(22) Filed: Jan. 16, 2002

(65) Prior Publication Data

US 2003/0133137 A1     Jul. 17, 2003

(51) Int. Cl.
*H04N 1/40* (2006.01)

(52) U.S. Cl. .................... 358/3.27; 358/2.1

(58) Field of Classification Search ........ 358/3.27, 358/2.1, 531–532, 518–523; 382/274, 260, 382/263–264, 266
See application file for complete search history.

(56) References Cited

U.S. PATENT DOCUMENTS

| | | | |
|---|---|---|---|
| 5,414,538 A | 5/1995 | Eschbach | 358/522 |
| 5,450,217 A | 9/1995 | Eschbach et al. | 358/518 |
| 5,450,502 A | 9/1995 | Eschbach et al. | 382/169 |
| 5,495,349 A * | 2/1996 | Ikeda | 358/518 |
| 5,581,370 A | 12/1996 | Fuss et al. | 358/447 |
| 6,072,907 A * | 6/2000 | Taylor et al. | 382/237 |
| 6,252,931 B1 * | 6/2001 | Aach et al. | 378/98.2 |

* cited by examiner

*Primary Examiner*—Thomas D. Lee
*Assistant Examiner*—Stephen Brinich
(74) *Attorney, Agent, or Firm*—Oliff & Berridge, PLC

(57) ABSTRACT

The invention is an automatic way to create background images from custom images, enabling cost efficient generation of highly customized products; such as advertisements, checks, greeting cards, stationary, clothing, passports, licenses, identification badges legal documents and legal tender; by generating intermediate image data by over-enhancing the sharpness of the custom image data and subsequently generating modified image data by reducing the sharpness, color and contrast of the intermediate image, whereby the resulting modified image is pleasing to the average consumer without interfering with the application of the product on which the background image is applied.

32 Claims, 5 Drawing Sheets

SYSTEMS AND METHODS FOR MODIFYING IMAGE DATA FOR BACKGROUND PRINTING

BACKGROUND OF THE INVENTION

1. Field of the Invention

This invention relates to modifying custom images for use as background images during printing or displaying.

2. Description of Related Art

Background images have a variety of applications. For example, background images are used for (1) advertisement purposes, on products tailored to individuals or groups of individuals, such as medical equipment, real estate listings and the like; (2) decorative purposes, in products such as checks, greeting cards, stationary and clothing; (3) identification purposes, in products such as passports, licenses and identification badges and (4) validation purposes, in products such as legal documents and legal tender.

The background images must be pleasing without adversely affecting the application on which the image resides. A pleasing image can be defined as an image having good color, good contrast, good sharpness and good exposure. A pleasing image is one that is easily recognized by an average consumer. A pleasing background image is one that exhibits the previous attributes in a manner that does not interfere with the primary application.

Checks are one example of a primary application, such as, for example, a financial interaction, where a pleasing background image is desired, but, at the same time, should not interfere with the foreground financial and personal data. Many financial institutions offer various pre-selected images that can be printed in the background of client checks. The images are pleasing (i.e., easily recognized by the client), and more importantly, do not interfere with the check's function.

Background images are typically carefully generated by graphic designers. These professionals generate images with specific applications in mind. Individual images are generated to be used by a multitude of consumers. For example, a graphic designer may design images of animals for a financial institution to be used as check backgrounds, or the designer may design images of common holiday scenes for use as background images in sales applications. These images are not personalized for individual clients. Rather, clients of the financial institution may select one of the background images or image sets designed by the graphic designer, but do not have the option of selecting a custom image, such as a picture of the individual client's pet. The pre-designed background images thus often lack one desired attribute of pleasing background images, the attribute of being easily recognized and personal.

It is impractical for graphic designers to design background images for individual consumers for every situation in which a background image may be used. It would take a great deal of time, and would subsequently involve high costs.

Individuals have the ability to prepare custom images of personal subjects. For example, various types of film-based and digital cameras are commercially available that can be used by the average consumer. However, the characteristics of photographs taken by individuals can vary greatly. As a result, these images often suffer from one or more image deficiencies, such as sharpness or exposure. As a result, no simple method exists to convert individual images for use as background images without subsequent processing by a human expert.

Systems exist that can modify images by applying a set of commonly desired values to the features of the images. Images with varying values for various image features, such as color, contrast, sharpness, exposure, luminance, etc., can be adjusted to a set of commonly desired values for these image features. In this manner, images from individual consumers can be improved to overcome differences in image feature values.

One such system is known as Automated Image Enhancement and is described in farther detail in U.S. Pat. Nos. 5,581,370, 5,450,502, 5,450,217 and 5,414,538, each incorporated herein by reference in its entirety. Image enhancement systems are coupled to a shift from "accurate reproduction" to "preferred reproduction". In the past, a typical application for copiers or scan-to-print image processing systems was to reproduce an input image as accurately as possible, i.e., render a copy. Thus, copies have been rendered as accurately as possible—including flaws. However, as individuals have become more knowledgeable in their document reproduction requirements, they have recognized that an exact copy is often not what is wanted. Instead, they would rather obtain the best possible image output.

Until recently, image quality from the output of a copier or a scan-to-print system was directly related to the input image quality. An example of an input image is a photograph. Unfortunately, photography is an inexact science, particularly among amateurs. Thus, original photographs are often of poor quality. Alternatively, technology, age and/or image degradation variations often result in images having an unsatisfactory and/or undesirable appearance. What is desired then is a copy giving the best possible image, rather than an exact copy of the original image.

Photography has long dealt with this issue. Analog filters and illumination variations can improve the appearance of images in an analog photographic process. Thus, for example, yellow filters enhance the appearance of white clouds against a blue sky in black and white images. Furthermore, various electro-photographic devices, including digital copiers, can clean up and improve images by adjusting threshold values, filtering parameters, and/or background suppression parameters. Generally, these methods are manual methods that must be selected on an image-by-image basis. Unfortunately, the casual user is not usually skilled enough to perform these operations. The inability to perform image enhancement operations is additionally exacerbated when dealing with color controls.

Automated image enhancement operates to vary images which are not perceived as good images, but does not operate on images which do not need to be improved, thereby allowing a stable process.

SUMMARY OF THE INVENTION

Due to the variation in the values of image features, custom images usually cannot be used as background images. Custom images with adjusted image feature values, i.e., such as image feature values adjusted using one or more automated image enhancement techniques, may be pleasing to the average consumer, but may interfere with the application of the product on which the background image is applied. Lightening the image, or similar softening process, may overcome this shortcoming, but the lightened image data often is no longer pleasing to the average consumer.

This invention separately provides systems and methods for generating an intermediate image from an input image.

This invention further provides systems and methods for generating a modified image from the intermediate image.

This invention separately provides systems and methods for generating an image usable as a background image.

The invention separately provides systems and methods for modifying an image for background printing.

An automated image enhancement system may be used in connection with a background image creation system to facilitate a simple image-to-background-image transformation starting from a specifically enhanced image.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

In various exemplary embodiments, the input image data is converted to intermediate image data by over-enhancing at least one image feature, e.g., the sharpness feature. The term "over-enhance" refers to augmenting a particular feature, the sharpness feature in this exemplary embodiment. One method by which over-enhancement of a feature of interest may be achieved is by altering the values of the feature of interest. For example, in order to over-enhance a sharpness feature of an image, sharpness values may be altered to a value above a commonly desired value.

Another method by which over-enhancement of a feature of interest may be achieved is by altering the values of at least one feature other than the feature of interest. For example, in order to over-enhance a sharpness feature of an image, contrast values may be altered to a value lower than a commonly desired value. Thus, any method, either known or later-developed, that results in the augmentation of a particular feature corresponds to over-enhancing that feature.

In the following detailed descriptions, the terms "commonly desired" or "commonly desired value(s)" refer to enhancement settings where the output image is intended for viewer preference applications. For example, a commonly desired contrast setting would result in an image that the average or intended observer would describe as an image "of good contrast".

In various exemplary embodiments, the input image data is converted to intermediate image data by altering the values of the sharpness feature of the input image data to a value that defines a sharper image than is commonly desired. Subsequently, the values of one or more image features, different from the sharpness feature, are altered to commonly desired values. The resulting intermediate image data is then converted to modified image data.

The intermediate image data is subsequently modified by altering the values of various features of the intermediate image data. In some exemplary embodiments, the saturation values are altered so that colors are reduced and/or softened from the intermediate image data. For example, strong reds will be seen as pastels or pinks. In some exemplary embodiments, the values of the black pixels are rescaled so that the blackest black of the intermediate image data is gray. In some exemplary embodiments, the luminance values of the intermediate image data are altered so that color values are moved relative to the rescaled black level values. In various exemplary embodiments, the contrast of the intermediate image data is reduced while maintaining a desired relationship between selected different image characteristics.

Figure 1:
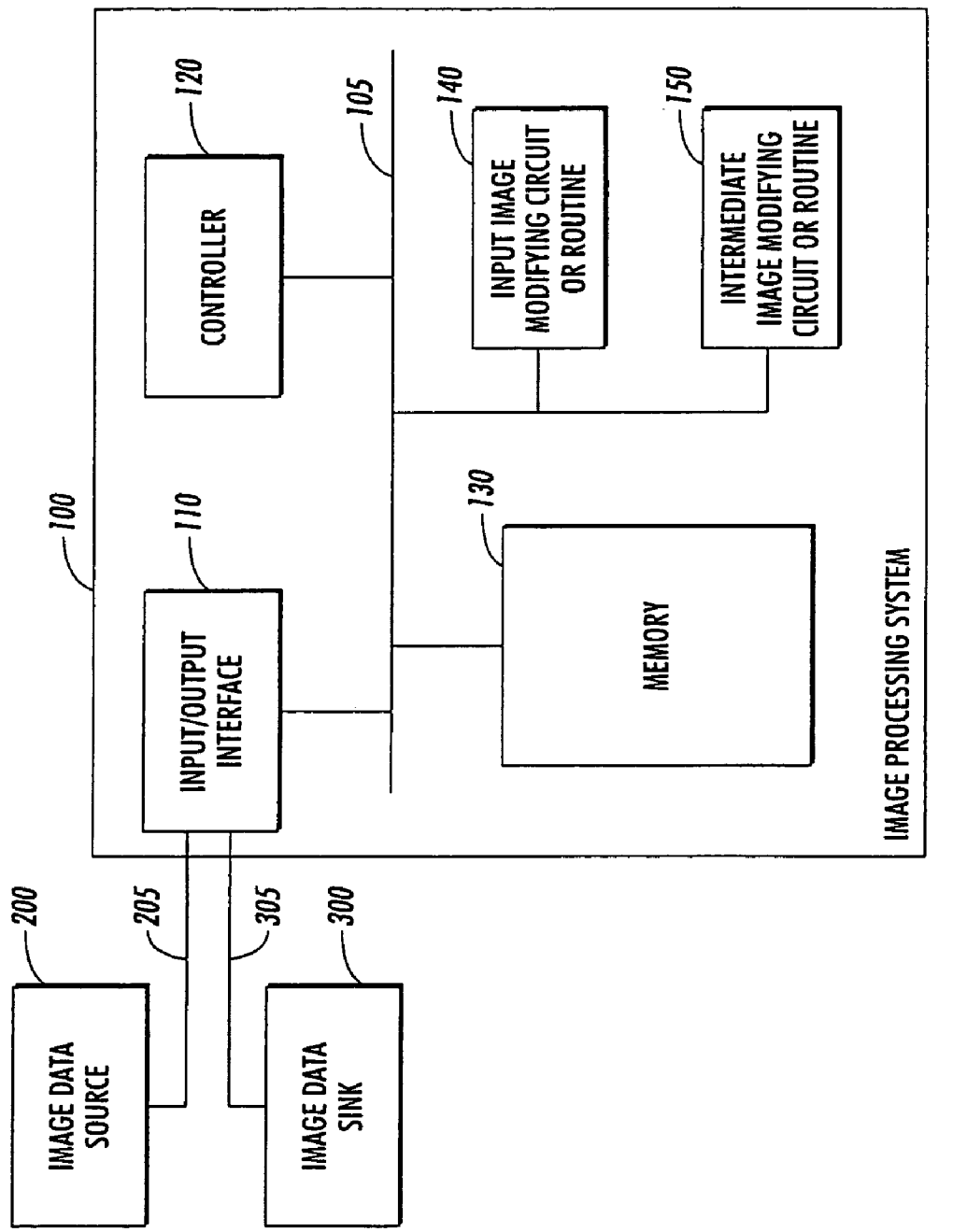
FIG. 1 shows a functional block diagram of one exemplary embodiment of a custom image processing system according to this invention.

FIG. 1 shows one exemplary embodiment of a generalized functional block diagram of a custom image processing system 100 according to this invention. The custom image processing system 100 is connectable to an image data source 200 over a signal line or link 205 and to an image data sink 300 over a signal line or link 305. The image data source 200 provides input image data to the custom image processing system 100. The image data sink 300 receives the modified images generated by the custom image processing system 100.

In general, the image data source 200 can be any one or more of a number of different sources, such as a paper or film scanner, a digital camera, a digital copier, a facsimile device that is suitable for generating electronic image data, or a device suitable for storing and/or transmitting electronic image data, such as a client or server of a network, such as the Internet, and especially the World Wide Web. Thus, the image data source 200 can be any known or later-developed source that is capable of providing image data to the custom image processing system 100. Similarly, the image data sink 300 can be any known or later-developed device that is capable of receiving the background image data output by the custom image processing system 100 and either storing, transmitting, reproducing, or displaying the background image data. Each of the signal lines or links 205 and 305 can be implemented using a public switched telephone network, a local or wide area network, an intranet, the Internet, a wireless transmission channel, or any other known or later-developed distributed network, or the like.

The custom image processing system 100 can be implemented as software executing on a programmed general purpose computer, a special purpose computer, a microprocessor or the like. In this case, the custom image processing system 100 can be implemented as a circuit or routine embedded in a printer driver, as a resource residing on a server, or the like. The custom image processing system 100 can also be implemented by physically incorporating it into a software and/or hardware system, such as the hardware and software systems of a printer or a digital photocopier.

The image data provided by the image data source 200 is received by the input/output interface 110. The image data from the input/output interface 110, under the control of the controller 120, is forwarded either directly to the input image modifying circuit or routine 140 or is initially stored in the memory 130. If the image data first is stored in the memory 130, the controller 120 can forward the image data from the memory 130 to the input image modifying circuit or routine 140.

The input image modifying circuit or routine 140 modifies the input image data by altering the values of one or more image features of the input image data. Any one or more image features, including but not limited to, sharpness, contrast, saturation, color or any other appropriate feature, whether known or later-developed, can be altered by the input image modifying circuit or routine 140. Zero, one or more of the remaining image features, alone or in combination, may be adjusted to common desired values, i.e., such as by any known or later-developed automated image enhancement technique.

In various exemplary embodiments, for example, when altering input image data so that the end-process modified image data is suitable for use as a background image, the input image modifying circuit or routine 140 may first alter the sharpness of the input image data to a value higher than a commonly desired value, such as a value commonly used in known automated image enhancement techniques, or such as a value that would normally be used in a pleasing image. That is, the sharpness is over-enhanced relative to some predefined value. The input image modifying circuit or routine 140 then alters the contrast and saturation values of the input image data to commonly desired values, such as a value commonly used in known automated image enhancement techniques, or such as a value that would normally be used in a pleasing image. In various exemplary embodiments, the intermediate image data is then output by the input image modifying circuit or routine 140, under control of the controller 120, to the intermediate image modifying circuit or routine 150.

In various exemplary embodiments, for example, when altering input image data so that the end-process modified image data is suitable for use as a background image, the input image modifying circuit or routine 140 may first alter the sharpness of the input image data to a value higher than a commonly desired value, such as a value commonly used in known automated image enhancement techniques, or such as a value that would normally be used in a pleasing image. That is, the sharpness is over-enhanced relative to some predefined value. The input image modifying circuit or routine 140 then alters the contrast and saturation values of the input image data to commonly desired values, such as a value commonly used in known automated image enhancement techniques, or such as a value that would normally be used in a pleasing image. In various exemplary embodiments, the intermediate image data is then output by the input image modifying circuit or routine 140, under the control of the controller 120, directly to the intermediate image modifying circuit or routine 150.

It should be appreciated that adjusting the sharpness to a commonly desired value and adjusting other image feature values to less than the commonly desired values is functionally equivalent to adjusting the sharpness to a value higher than a commonly desired value. Over-enhancement by adjusting the sharpness to a commonly desired value and adjusting other image feature values to less than the commonly desired values is commonly the simpler processing and thus desirably easier to implement.

Alternatively, in various other exemplary embodiments, the intermediate image data is output by the input image modifying circuit or routine 140, under control of the controller 120, to the memory 130. In this case, the controller 120, at some later time, outputs the intermediate image data from the memory 130 to the intermediate image modifying circuit or routine 150.

The intermediate image modifying circuit or routine 150 creates modified image data from the intermediate image data. Any one or more image features, including but not limited to sharpness, contrast, saturation, color, luminance or any other appropriate features, whether known or later-developed, can be modified by the intermediate image modifying circuit or routine 150. In various exemplary embodiments, when modifying the intermediate image data so that the modified image data is suitable for use as a background image, the intermediate image modifying circuit or routine 150 may alter the values for one or more image features. This may include those features that had been modified by the input image modifying circuit or routine 140 to generate the intermediate image. In addition, multiple image features may be adjusted proportionately to one another. Further, multiple image features may be adjusted in the same or in different ways, i.e., certain feature values may be increased while other feature values may be decreased.

For example, in various exemplary embodiments, when altering the intermediate image data so that the end-process modified image data is suitable for use as a background image, the intermediate image modifying circuit or routine 150 may alter the values for image features, including but not limited to sharpness, saturation, contrast, color, black level, luminance or any other appropriate feature, whether known or later-developed. In various exemplary embodiments, the modified image data is then output by the intermediate image modifying circuit or routine 150, under the control of the controller 120, through the input/output interface 110 to the image data sink 300.

Alternatively, in various other exemplary embodiments, the modified image data is output by the intermediate image modifying circuit or routine 150, under the control of the controller 120, to the memory 130. The controller 120, at some later time, outputs the modified image data from the memory 130 through the input/output interface 110 to the image data sink 300.

Figure 2:
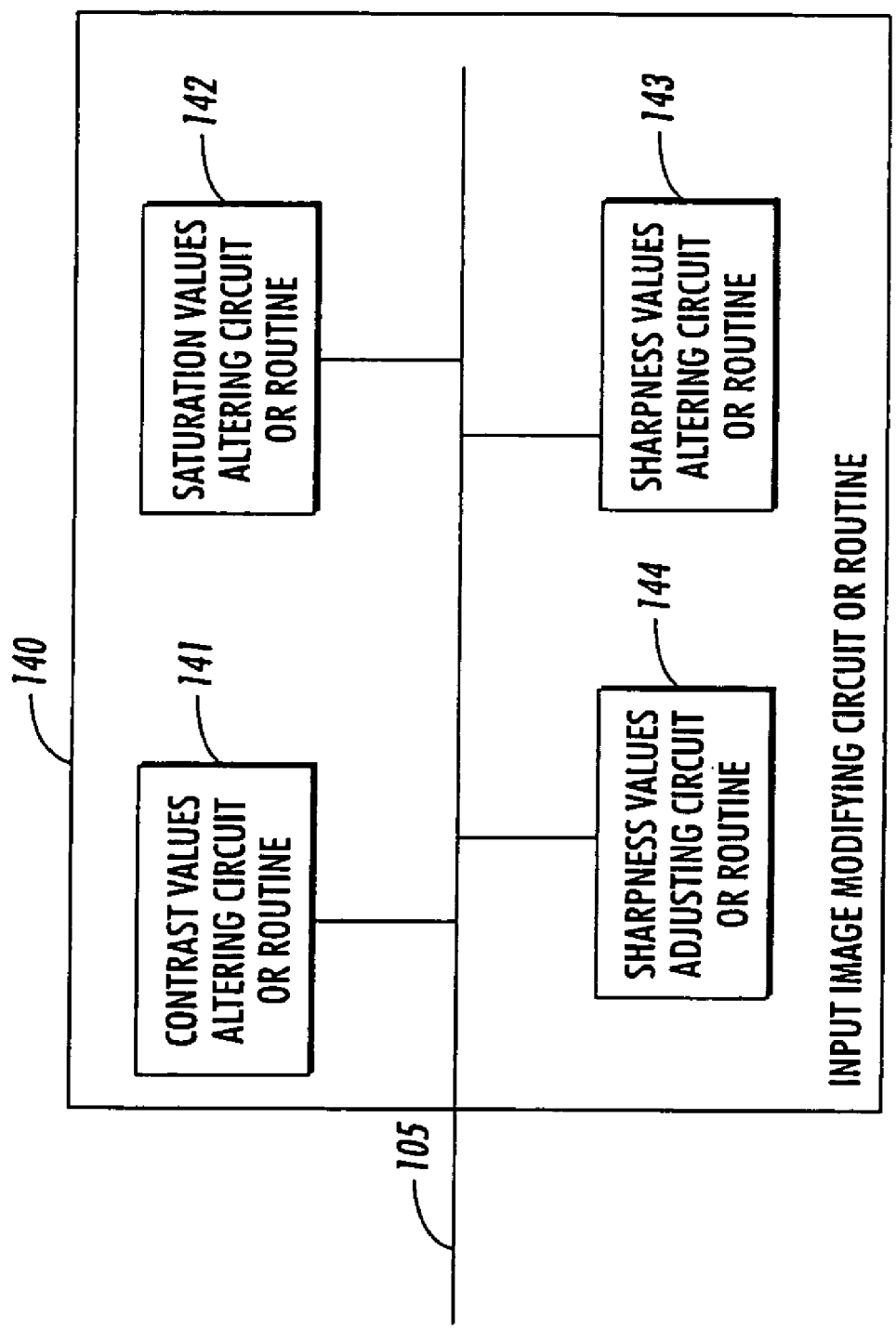
FIG. 2 is a block diagram outlining in greater detail an exemplary embodiment of the input image modifying circuit or routine of FIG. 1.

FIG. 2 shows in greater detail one exemplary embodiment of the input image modifying circuit or routine 140 of FIG. 1. In particular, the specific embodiment of the input image modifying circuit or routine 140 shown in FIG. 2 is directed to generating an over-sharpened image that will eventually be usable as a background image. In this exemplary embodiment, the over-sharpened image data uses commonly desired values for the contrast and saturation features, as described above. It should be appreciated that intermediate images usable for other purposes may be generated by the input image modifying circuit or routine 140. In that situation, the input image modifying circuit or routine 140 will have different subcircuit, modules, sub-routines and/or objects than those shown in FIG. 2.

As shown in FIG. 2, in this particular exemplary embodiment, the input image modifying circuit or routine 140 comprises a contrast values altering circuit or routine 141, a saturation values altering circuit or routine 142, a sharpness values altering circuit or routine 143 that either contains or is connected to a sharpness value adjusting circuit or routine 144. In various exemplary embodiments, the sharpness value adjusting circuit or routine 144 can be implemented using a sharpness values offsetting circuit or routine and/or a sharpness value gain adjust circuit or routine. In particular, the contrast altering and saturation altering circuits or routines 141 and/or 142 alter the values of the input image data for these image features to selected commonly desired values. That is, the contrast and saturation values of the input image data are altered by the contrast and saturation altering circuits or routines 141 and 142, respectively, so that the values of these image features are adjusted to the selected commonly desired values, if they are not already at such values. That is, if the values for the contrast and saturation image features of the input image data are already at the selected commonly desired values, they will not be altered by the contrast altering and saturation altering circuits or routines 141 and 142, respectively.

The sharpness altering circuit or routine 143 alters the values of the sharpness of the input image data to a value that is "higher" than a commonly desired sharpness value, such as that commonly used in various known automated image enhancement techniques. For example, in various known automated image enhancement techniques, a commonly desired sharpness value may be increased by a gain factor of "2". The sharpness altering circuit or routine 143 serves to sharpen the image data to at least this value if the value of the sharpness of the image data is lower than this value. If the sharpness of the image data is already at least this sharp, the image data is not further sharpened. However, it should be appreciated that standard pleasing images will have a sharpness value well below the desired sharpness value for this application, so that, in various exemplary embodiments, further sharpening may be required.

In various exemplary embodiments, to create the desired modified image data suitable for use as a background image, the sharpness altering circuit or routine 143 increases the sharpness value of the sharpness feature of the input image data by an offset of 50% over the desired value.

In another exemplary embodiment, the sharpness altering circuit or routine 143 increases the sharpness value of the sharpness feature of the input image data, by using a combination of a gain factor and an offset, to create the desired modified image data suitable for use as a background image. It should be appreciated that the actual value used by the sharpness altering circuit or routine 144 is an artifact of the particular enhancement techniques used to create the intermediate image data. However, it should be appreciated that the relative magnitude of the values outlined above gives an idea of the alteration above the usual commonly desired sharpness value created by the input image modifying circuit or routine 140.

Figure 3:
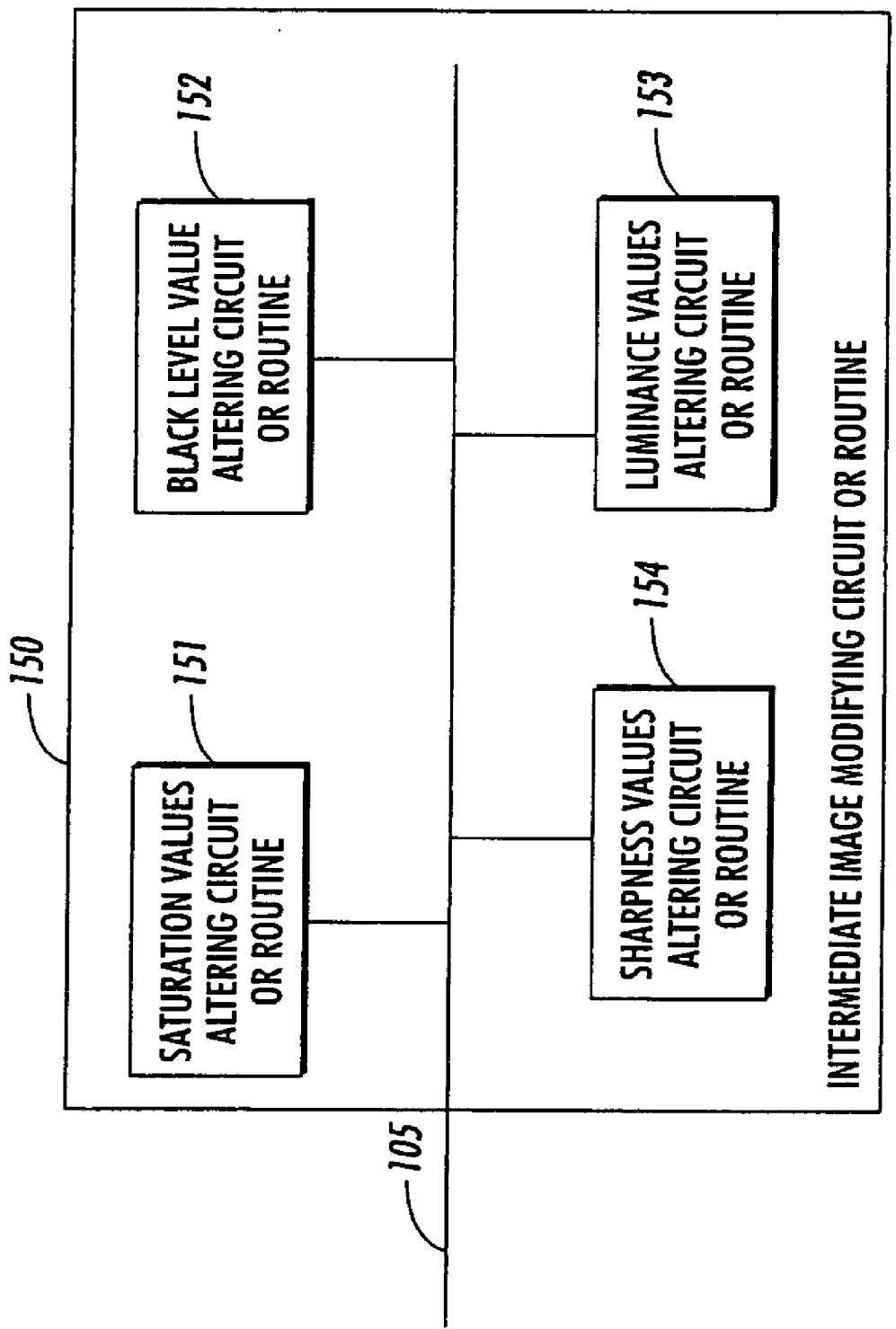
FIG. 3 is a block diagram outlining in greater detail an exemplary embodiment of the intermediate image modifying circuit or routine of FIG. 1.

FIG. 3 shows in greater detail one exemplary embodiment of the intermediate image modifying circuit or routine 150 of FIG. 1. In particular, the specific embodiment of the intermediate image modifying circuit or routine 150, shown in FIG. 3, is directed to modifying the intermediate image data so that it may be usable as a background image. It should be appreciated that modified images usable for other purposes may be generated. In that case, the intermediate image modifying circuit or routine 150 will have different sub-circuits, modules, sub-routines and/or objects than those shown in FIG. 3.

As shown in FIG. 3, in this particular exemplary embodiment, the intermediate image modifying circuit or routine 150 comprises a saturation values altering circuit or routine 151, a black level values altering circuit or routine 152 and a luminance values altering circuit or routine 153. In the functionally-equivalent exemplary embodiment described above, where the sharpness parameter is not increased with respect to common desired values, an optional sharpness values altering circuit or routine 154 is included.

In particular, the saturation value altering circuit or routine 151 alters the value of the intermediate image data so that the saturation values in the modified image data are less than the common desired values for this image feature. This, in effect, removes colorfulness from the intermediate image. For example, the saturation values altering circuit or routine 151 can change a strong red in the intermediate image data into a pastel or pink in the modified image data. The black level values altering circuit or routine 152 rescales the black levels of the intermediate image data. This, in effect, removes black from the over-enhanced image data. As a result, the blackest black of the intermediate image data will be interpreted as gray.

The luminance value altering circuit or routine 153 alters the luminance of all of the other colors of the intermediate image data in coordination with the rescaled black level. Specifically, in various exemplary embodiments, an "inverse-gamma-inverse" operation is performed on the luminance of the intermediate image data. The "inverse-gamma-inverse" operation is commonly used in color gamut mapping applications.

Figure 4:
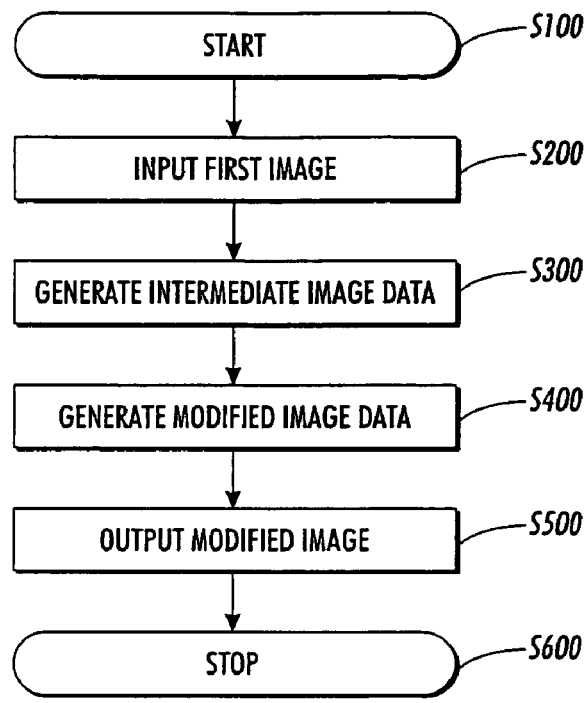
FIG. 4 is a flowchart outlining one exemplary embodiment of a method for modifying a custom image for background printing, according to this invention.

FIG. 4 is a flowchart outlining one exemplary embodiment of a method for modifying image data according to this invention. Beginning in step S100, operation proceeds to step S200, where image data is input. Then, in step S300, intermediate image data is generated by altering one or more image features of the input data. Next, in step S400, modified image data is generated by altering one or more image features of the intermediate image data. Then, in step S500, the modified image data, resulting from steps S100–S400, is transmitted to an output device, which may immediately use or store the modified image data. Operation then continues to step S600, where operation of the method stops.

Figure 5:
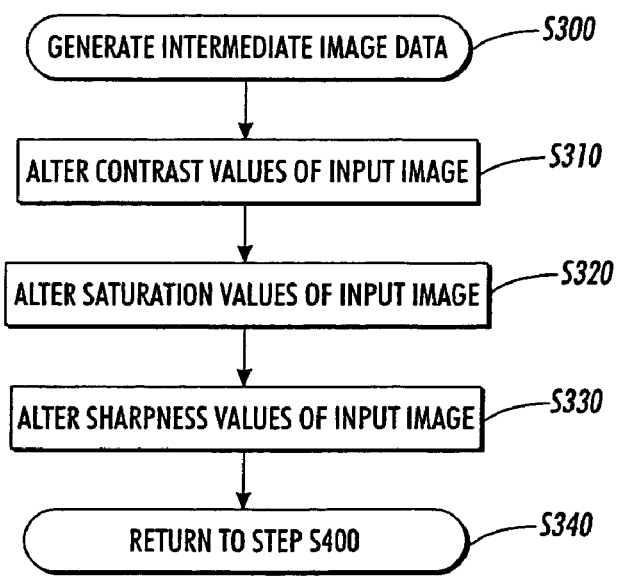
FIG. 5 is a flowchart outlining one exemplary embodiment of a method for generating intermediate image data according to this invention.

FIG. 5 is a flowchart outlining one exemplary embodiment of a method for generating intermediate image data from an input image according to this invention. Beginning on step S300, operation proceeds to step S310, where the contrast values of the input image data are altered to a commonly desired value. Next, in step S320, the saturation values of the input image data are altered to a commonly desired value. Then, in step S330, the sharpness of the input image data is over-enhanced by altering the sharpness values to a value higher than a commonly desired value. Operation then continues to step S340, where operation returns to step S400.

Figure 6:
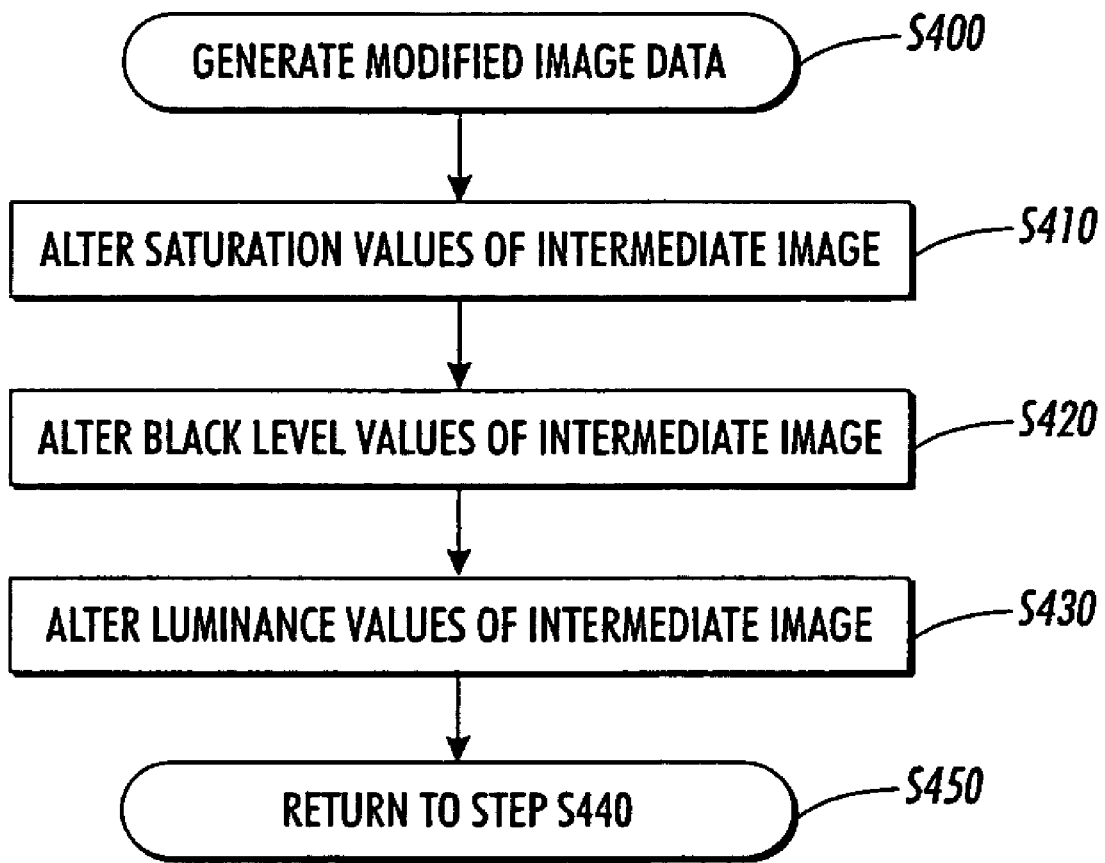
FIG. 6 is a flowchart outlining one exemplary embodiment of a method for generating modified image data according to this invention.

FIG. 6 is a flowchart outlining one exemplary embodiment of a method for generating modified image data from intermediate image data according to this invention. Beginning in step S400, operation proceeds to step S410, where the saturation values of the intermediate image data are altered to a value lower than a commonly desired value. Next, in step S420, the black level values of the input image are rescaled such that the blackest black of the intermediate image data is interpreted as gray. Then in step S430, the luminance values of the intermediate image data are altered to correspond with the rescaled black level. Operation then continues to step S440, where operation returns to step S500.

The image processing system 100 is, in various exemplary embodiments, implemented on a programmed general purpose computer. However, the image processing system 100 can also be implemented on a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device capable of implementing a finite state machine that is in turn capable of implementing the flowchart shown in FIG. 4 can be used to implement the image processing system 100.

The memory 130 can be implemented using any appropriate combination of alterable, volatile or non-volatile, memory; or non-alterable or fixed memory. The alterable memory, whether volatile or non-volatile, can be implemented using any one or more of static or dynamic RAM, a floppy disk and disk drive, a writeable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be appreciated that each of the circuits shown in FIGS. 1–3 can be implemented as portions of a suitably programmed general purpose computer. Alternatively, each of the circuits or routines shown in FIGS. 1–3 can be implemented as physically distinct hardware circuits within a digital signal processor, an ASIC, or using a FPGA, a PDL, a PLA or a PAL, or using discrete logic elements or discrete circuit elements. The particular form each of the circuits or routines shown in FIGS. 1–3 will take is a design choice and will be obvious and predicable to those skilled in the art.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 200 is thus any known or later developed device which is capable of supplying electronic image data over the link 205 to the image processing system 100. The link 205 can thus be any known or later developed system or device for transmitting the electronic image data from the image data source 200 to the image processing system 100.

In general, the image data source 200 can be any one of a number of different sources, such as a scanner, a digital copier, a facsimile device that is suitable for generating electronic image data, or a device suitable for storing and/or transmitting electronic image data, such as a client or server of a network, or the Internet, and especially the World Wide Web. For example, the image data source 200 may be a scanner, or a data carrier such as a magnetic storage disk, CD-ROM or the like, or a host computer, that contains scanned image data. Similarly, the image data source can be any known structural apparatus for indefinitely storing the enhanced image data, such as a RAM, a hard drive and disk, a floppy drive and disk, an optical drive and disk, a flash memory or the like. Thus, the image data source 200 can be any known or later developed source that is capable of providing image data to the image processing system 100 of this invention.

In general, the image data sink 300 can be any device that is capable of transmitting, outputting and/or storing the processed image data generated using the systems and methods according to this invention, such as a printer, a copier or other image forming devices, a facsimile device, a display device, a memory, or the like.

While FIG. 1 shows the image processing system 100 as a separate device from the image data source 200, the image processing system 100 may be an integrated device, such as a digital copier, computer with a built-in printer, or any other integrated device that is capable of producing a hard or soft copy image output. With such a configuration, for example, the image data source 200, the image processing system 100 and the image data sink 300 may be contained within a single device.

Alternatively, the image processing system 100 may be a separate device attachable upstream of a stand-alone image data sink 300. For example, the image processing system 100 may be a device which interfaces with both the image data source 200 and the image data sink 300. For example, the image processing system 100 may be incorporated into a network print server that manages printer data for a plurality of the same or different printer devices. Furthermore, the image processing system 100 may be implemented as software on the image data source 200 or the image data sink 200. Other configurations of the elements shown in FIG. 1 may be used without departing from the spirit and scope of this invention.

When the image data source 200 is a personal computer, the link 205 connecting the image data source 200 to the image processing system 100 can be a direct link between the personal computer and the image processing system 100. The link 205 can also be a local area network, a wide area network, the Internet, an intranet, or any other distributed processing and storage network. Moreover, the link 205 can also be a wireless link to the image data source 200. Accordingly, it should be appreciated that the image data source 200 can be connected using any known or later-developed system that is capable of transmitting data from the image data source 200 to the image processing system 100. Similarly, the signal line or link 305 can be implemented using one or more of a public switched telephone network, a local or wide area network, an intranet, an extranet, the Internet, or any other known or later-developed distributed network, or the like. The signal line or link 305 can include a wire and/or a wireless transmission channel.

While this invention has been described in conjunction with the exemplary embodiments outlined above, it is evident that many alternatives, modifications and variations will be apparent to those skilled in the art. As explained above, although the exemplary embodiments of the invention determine the final contrast, color and sharpness levels, the invention can be changed to modify the overall 'contrast' of the image in response to customer feedback. Accordingly, the exemplary embodiments of the invention as set forth above are intended to be illustrative, not limiting. Various changes may be made without departing from the spirit and scope of the invention as defined in the following claims.

What is claimed is:

1. A system for generating modified image data, comprising:
    an input image modifying circuit or routine that over-enhances at least one image feature of input image data to generate intermediate image data; and
    an intermediate image modifying circuit or routine that alters at least one over-enhanced image feature and at least one other image feature of the intermediate image data to generate the modified image data,
    wherein the input image modifying circuit or routine over-enhances at least a sharpness feature of the input image.

2. The system according to claim 1, wherein the input image modifying circuit or routine comprises a sharpness values altering circuit or routine.

3. The system according to claim 2, wherein the sharpness values altering circuit or routine alters the sharpness values of the input image data to values above a commonly desired value.

4. The system according to claim 1, wherein the input image modifying circuit or routine further comprises at least one of:
   a contrast values altering circuit or routine; and
   a saturation values altering circuit or routine.

5. The system according to claim 4, wherein the contrast values altering circuit or routine alters the contrast values of the input image data to values below a commonly desired value.

6. The system according to claim 4, wherein the saturation values altering circuit or routine alters the saturation values of the input image data to values below a commonly desired value.

7. The system according to claim 1, wherein the intermediate image modifying circuit or routine comprises a sharpness values altering circuit or routine.

8. The system according to claim 1, wherein the intermediate image modifying circuit or routine comprises at least one of:
   a saturation values altering circuit or routine;
   a black level value altering circuit or routine; and
   a luminance values altering circuit or routine.

9. A system according to claim 8, wherein the intermediate image modifying circuit or routine comprises said saturation values altering circuit or routine, and wherein the saturation values altering circuit or routine alters saturation values of the intermediate image data to values below a commonly desired value.

10. A system according to claim 8, wherein the intermediate image modifying circuit or routine comprises said black level value altering circuit or routine, and wherein the black level value altering circuit or routine rescales black level value of the intermediate image data.

11. A system according to claim 8, wherein the black level value altering circuit or routine rescales black level value of the intermediate image data to a value such that a blackest black of the intermediate image data is interpreted as gray.

12. A system according to claim 8, wherein the intermediate image modifying circuit or routine comprises said luminance values altering circuit or routine, and wherein the luminance values altering circuit or routine alters luminance of all other colors of the intermediate image data to correspond with the altered black level value.

13. A system according to claim 12, wherein the luminance values are altered by an inverse-gamma-inverse operation.

14. A system according to claim 1, wherein:
   the input image modifying circuit or routine comprises:
   a sharpness values altering circuit or routine,
      a sharpness values offsetting circuit or routine,
      a contrast values altering circuit or routine, and
      a saturation values altering circuit or routine; and
   the intermediate image modifying circuit or routine comprises:
      a sharpness values altering circuit or routine,
      a saturation values altering circuit or routine,
      a black level value altering circuit or routine, and
      a luminance values altering circuit or routine.

15. A system according to claim 1, wherein the generated modified image data is suitable for use as a background image.

16. A system according to claim 15, wherein the generated modified image data is suitable for use as a background image for checks.

17. A method for generating modified image data, comprising:
   over-enhancing at least one image feature of input image data to generate intermediate image data; and
   altering the at least one over-enhanced image feature and at least one other image feature of the intermediate image data to generate the modified image data,
   wherein generating the intermediate image data comprises over-enhancing at least a sharpness feature of the input image data.

18. A method according to claim 17, wherein generating the intermediate image data comprises altering the values of a sharpness feature of the input image data to a value above a commonly desired value.

19. A method according to claim 17, further comprising, when generating the intermediate image data, altering the values of at least one image feature of the input image data different from at least one over-enhanced image feature.

20. A method according to claim 19, further comprising, when generating the intermediate image data, altering at least one of:
   contrast values of the input image data; and
   sharpness values of the input image data.

21. A method according to claim 20, wherein altering the contrast values comprises altering the contrast values of the input image data to values below a commonly desired value.

22. A method according to claim 20, wherein altering the saturation values comprises altering the saturation values of the input image data to values below a commonly desired value.

23. A method according to claim 17, further comprising, when generating the modified image data, altering the sharpness values of the intermediate image data.

24. A method according to claim 17, comprising when generating the modified image data, altering at least one of:
   saturation values of the intermediate image data;
   black level value of the intermediate image data; and
   luminance values of the intermediate image data.

25. A method according to claim 24, wherein the method comprises when generating the modified image data, altering said saturation values of the intermediate image data, wherein altering the saturation values comprises altering the saturation values of the intermediate image data to values below a commonly desired value.

26. A method according to claim 24, wherein the method comprises when generating the modified image data, altering said black level value of the intermediate image data, wherein altering the black level value comprises rescaling the black level value of the intermediate image data.

27. A method according to claim 26, wherein rescaling the black level value comprises rescaling the black level value of the intermediate image data to a value such that a blackest black of the intermediate image data is interpreted as gray.

28. A method according to claim 24, wherein the method comprises when generating the modified image data, altering said luminance values of the intermediate image data, wherein altering the luminance values comprises altering the luminance values of all other colors of the intermediate image data in coordination with the altered black level value.

29. A method according to claim 26, wherein altering the luminance values comprises altering the luminance values of the intermediate image data using an inverse-gamma-inverse operation.

30. A method according to claim 17, wherein:
generating the intermediate image data comprises:
  altering sharpness values of the input image to values above a commonly desired value;
  offsetting sharpness values of the input image,
  altering contrast values of the input image, and
  altering saturation values of the input image; and
generating the modified image data comprises:
  altering sharpness values of the intermediate image data,
  altering saturation values of the intermediate image data,
  rescaling black level value of the intermediate image data, and
  altering luminance values of the intermediate image data.

31. A method according to claim 30, wherein the generated modified image data is suitable for use as a background image for checks.

32. A method according to claim 17, wherein the generated modified image data is suitable for use as a background image.

* * * * *